United States Patent [19]

Nakamura

[11] Patent Number: 4,624,489

[45] Date of Patent: * Nov. 25, 1986

[54] PIPE CONNECTION METHOD AND CONNECTING STRUCTURE

[75] Inventor: Matsuichi Nakamura, Osaka, Japan

[73] Assignee: Daiwa Steel Tube Industries Co., Ltd., Japan

[*] Notice: The portion of the term of this patent subsequent to Sep. 17, 2002 has been disclaimed.

[21] Appl. No.: 661,418

[22] Filed: Oct. 16, 1984

Related U.S. Application Data

[63] Continuation-in-part of Ser. No. 401,003, Jul. 22, 1982, Pat. No. 4,541,659.

[30] Foreign Application Priority Data

Oct. 25, 1983 [JP] Japan .................. 58-198343

[51] Int. Cl.$^4$ ................. F16L 13/14
[52] U.S. Cl. ................. 285/382; 285/382.2; 285/417; 285/55; 29/508
[58] Field of Search ............ 285/382, 382.1, 382.2, 285/417, 55; 29/508, 516

[56] References Cited

U.S. PATENT DOCUMENTS

| 2,192,914 | 3/1940 | Ice | 285/382.2 |
|---|---|---|---|
| 3,343,252 | 9/1967 | Reesor | 285/382.2 |
| 3,498,648 | 3/1970 | Hallesy | 285/382.2 |
| 3,596,939 | 8/1971 | Gibson | 285/382.2 |
| 3,893,718 | 7/1975 | Powell | 285/382.2 |
| 3,956,815 | 5/1976 | Capper | 285/382.2 |
| 4,035,007 | 7/1977 | Harrison | 285/417 |
| 4,061,367 | 12/1977 | Moebius | 285/382.2 |
| 4,231,596 | 11/1980 | Ridenour | 29/516 |
| 4,257,155 | 3/1981 | Hunter | 285/382.2 |
| 4,482,174 | 11/1984 | Puri | 29/508 |

FOREIGN PATENT DOCUMENTS

| 1809491 | 5/1970 | Fed. Rep. of Germany | 285/382.2 |
|---|---|---|---|
| 2332241 | 3/1979 | Fed. Rep. of Germany | |
| 3226868 | 4/1983 | Fed. Rep. of Germany | |
| 13587 | 4/1972 | Japan | 285/382.2 |
| 88939 | 7/1980 | Japan | 29/508 |
| 2107812 | 5/1983 | United Kingdom | 285/382.2 |

Primary Examiner—Cornelius J. Husar
Assistant Examiner—Eric Nicholson
Attorney, Agent, or Firm—Thomas & Kennedy

[57] ABSTRACT

A connection structure and method comprising the steps of providing a cylindrical joint member for connecting a first pipe and a second pipe inserted into opposite ends of said cylindrical joint towards the center of said cylindrical joint member and holding said pipes in such a position that their ends are separated only by a narrow gap, and compressing both ends and the center of said cylindrical joint member to form airtight seals between said first and second pipes and the ends of said cylindrical joint member and also between the ends of said first and second pipes and the middle part of said cylindrical joint member.

8 Claims, 5 Drawing Figures

PIPE CONNECTION METHOD AND CONNECTING STRUCTURE

REFERENCE TO RELATED APPLICATION

This is a continuation-in-part of application Ser. No. 401,003 filed July 22, 1982, now U.S. Pat. No. 4,541,659 issued Sept. 17, 1985.

BACKGROUND OF THE INVENTION

1. Field of the Invention

This method relates to a pipe connection method and connecting structure. More specifically, it relates to the connection method and connecting structure of lance pipe used to blow oxygen into the steel bath in, for example, an open-hearth furnace or electric furnace.

2. Description of the Prior Art

The lance pipe used to blow oxygen into the steel bath in an open-hearth furnace or electric furnace can be exposed to, for example, temperatures of 1800° C. and therefore wear easily. Pipes which have become shorter can be reused by connecting them with suitable joints. In this case the lance pipes must be connected by air-tight joints to prevent oxygen from leaking out.

Until now, lance pipe connections have been made by inserting the ends of the lance pipes into opposite ends of a cylindrical joint member and compressing the ends to seal them shut. In this method it is difficult to position the lance pipe ends near the center of the joint member and the pressure fitting can easily be uneven, allowing oxygen to leak out. In addition, since the ends of the joint members are separately compressed into the ends of the lance pipes by a hydraulic device, it is difficult to improve the efficiency of the work.

SUMMARY OF THE INVENTION

This invention was conceived with a view to solving the problems described above. The first purpose of this invention is to provide a connection method and connecting structure that will improve the air tightness of lance pipe connections.

The second purpose of this invention is to provide a connection method and connecting structure which permit both ends of a cylindrical joint member to be compressed into the ends of the lance pipes simultaneously.

The third purpose of this invention is to provide a connection method and connecting structure which make it easy for both lance pipe ends to be positioned near the center of the cylindrical joint member.

In order to accomplish the said objectives, in this invention both ends and the center of the cylindrical joint member are compressed when fitted over the ends of the lance pipes, thus insuring good air tightness at two locations. In addition, ring-shaped grooves can be cut near both ends of the joint member to make it easier to compress the ends into the ends of the lance pipes, or a protrusion can be formed in the center of the inside of the joint member to improve contact with the lance pipes.

DESCRIPTION OF THE PREFERRED EMBODIMENTS

Figure 1:
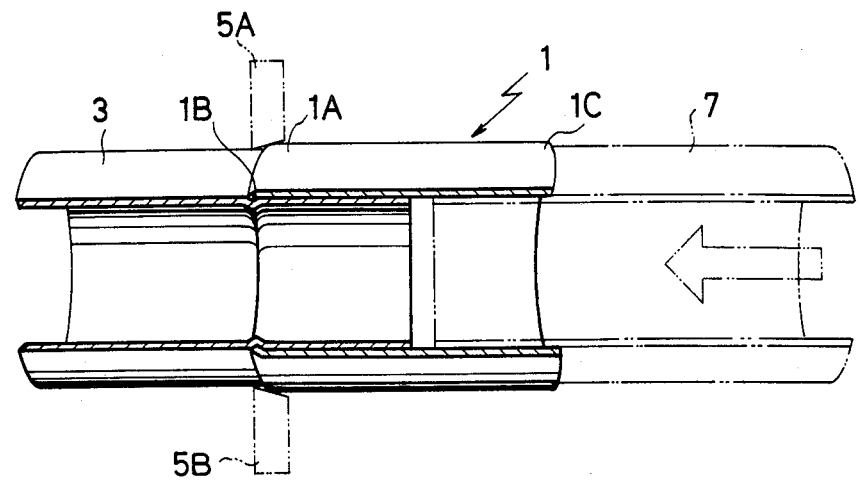
FIG. 1 is a partially cut-away front devational view of a joint relating to the present invention.

Referring to FIG. 1, the joint member 1 is made of metal and formed into a cylindrical shape. One end 1A of this joint member 1 is fitted over the end of the first metal pipe 3 so that the end of the pipe 3 reaches almost to the center of the joint member 1. The end 1A of the joint member 1 is formed in the shape of a semicircular arc. It is compressed by the two compression jigs 5A and 5B which are located opposite to each other, and the edge 1B of the end 1A of the joint member 1 cuts sharply into the first pipe 3 to seal the joint air-tight and to hold it in place.

Figure 2:
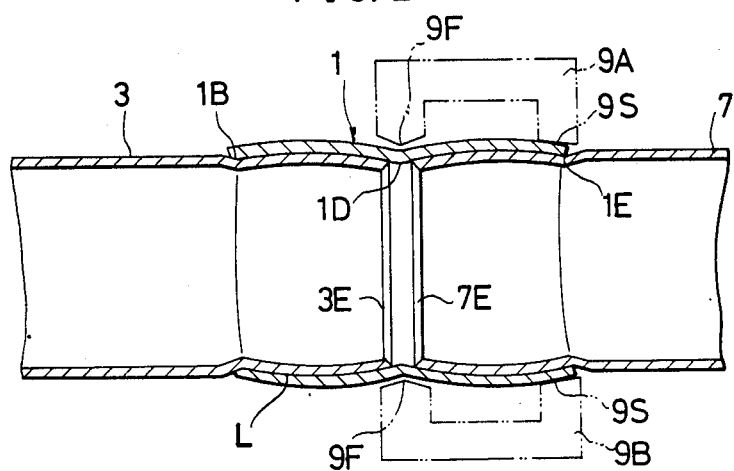
FIG. 2 is a cross-sectional view showing one pipe connected to another pipe according to the present invention.

After the joint member 1 has been compressed over the end of the first pipe 3, the other end 1C of the joint member 1 is fitted over the end of the other pipe to be connected. The second pipe 7 is positioned so as to leave an appropriate gap between the end of the first pipe 3 and the end of the second pipe 7. After the second pipe 7 is positioned, as shown in FIG. 2, the center 1D and the end 1C of the joint member 1 are compressed by the compression jigs 9A and 9B which are positioned opposite to each other and each of which includes a first compression part 9F which is shaped in a semicircular arc and sharpened with a nearly triangular cross-section, and a second compression part 9S which has an appropriate shape. The edge 1E of the end 1C of the joint member 1 cuts sharply into the second pipe 7 to seal the joint air-tight and hold it in place.

In addition, the center 1D of the joint member 1 butts in between the end 3E of the first pipe 3 and the end 7E of the second pipe 7 to reinforce the air tightness.

As can be understood from the above explanation, the compressive connection of the ends 1A and 1C of the joint member 1 to the first and second pipes 3 and 7 creates an airtightsection at each end of the joint. A second pair of airtight contacts is created by the compression of the ends 3E and 7E of the first and second pipes 3 and 7 on either side of the center 1D of the joint member 1. This pair of double airtight seals improves the air tightness of the joint. To improve the strength and air tightness of the joint still further it is desirable for the inside of the joint member 1 to be lined with a layer L of soft metal, alloy or ceramic by a process such as plating or calorizing.

Figure 3:
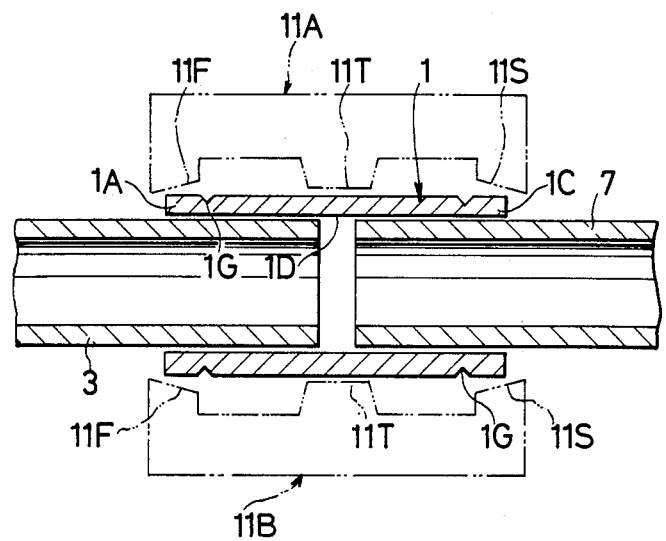
FIG. 3 is a cross-sectional view showing the joint in another embodiment.
Figure 4:
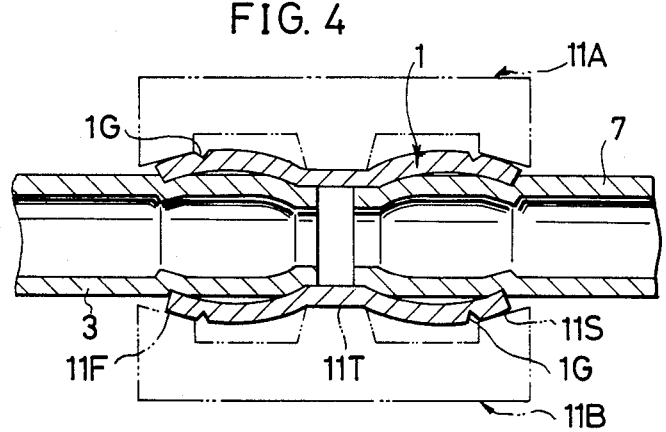
FIG. 4 is a cross-sectional view showing one pipe connected to another pipe in another embodiment of the present invention.

FIGS. 3 and 4 show another embodiment of this invention. In this embodiment ring-shaped grooves 1G are cut around the joint member 1 near the ends 1A and 1C. By cutting these grooves 1G around the joint member 1 near the ends 1A and 1C, it becomes possible to compress the ends 1A and 1C of the joint member 1 with a relatively small external force. Consequently, in this embodiment both ends 1A and 1C and the center 1D of the joint member 1 can be compressed simultaneously by the compression jigs 11A and 11B each of which has the semicircular compression parts 11F, 11S and 11T, in order to join the joint member 1 to the first and second pipes 3 and 7. That is to say, as shown in FIG. 4, the joint member 1 is compressed simultaneously at several locations to join it to the first and second pipes 3 and 7, which in this embodiment increases the efficiency of the operation.

Figure 5:
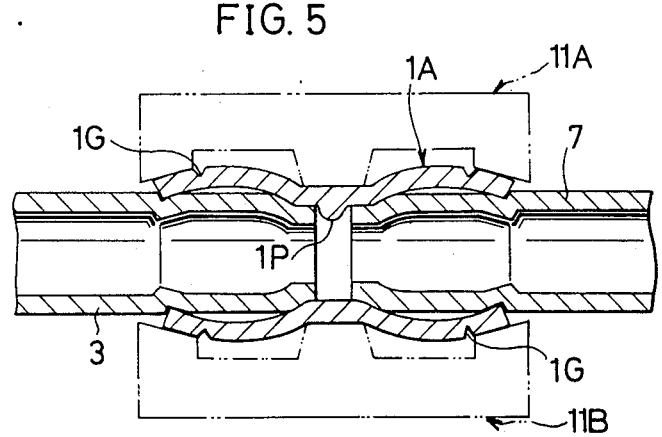
FIG. 5 is a cross-sectional view showing the connection in still another embodiment.

FIG. 5 shows still another embodiment. In this embodiment there is a protrusion 1P on the inside of the joint member 1 at the center. When the first and second pipes 3 and 7 are inserted into the joint member 1, the ends of the pipes 3 and 7 butt up against the protrusion 1P, so that the positions of the ends of the pipes 3 and 7 are determined accurately.

As can be understood from the above explanations of embodiments, in the present invention, since the first and second pipes 3 and 7 and the joint member 1 are compressed at both ends and also at the center of the joint member 1 in such a way that the ends of the pipes cut into the joint member and the ends of the joint member cut into the pipes, double airtight seals are obtained, improving the air tightness. In addition, by forming a protrusion at the center of the inside of the joint member 1, the positions of the first and second pipes 3 and 7 can be accurately and a rapidly determined merely by inserting them into opposite ends of the joint member 1 until they butt up against the protrusion. In addition, by cutting grooves into the joint member 1 near both ends, it becomes possible to compress both ends of the joint member 1 with relatively little external force, so that the joint member 1 can be compressed in several locations simultaneously, increasing the efficiency of the operation in which the first and second pipes 3 and 7 are jointed.

What is claimed is:

1. A connection method comprising the steps of providing a cylindrical joint member for connecting a first pipe and a second pipe inserted into opposite ends of said cylindrical joint member towards the center of said cylindrical joint member and holding said pipes in such a position that their ends are separated only by a narrow gap, and compressing both ends and the center of said cylindrical joint member to form airtight seals between said first and second pipes and the ends of said cylindrical joint member and also between the ends of said first and second pipes and the middle part of said cylindrical joint member.

2. The connection method described in claim 1 characterized in that compression of both ends and the center of said cylindrical joint member is done simultaneously.

3. The connection method described in claim 1 characterized in that the first pipe is inserted into one end of the cylindrical joint member before compressing that end, and then the second pipe is inserted into the other end of the cylindrical joint member before compressing that end and the center of the cylindrical joint member.

4. A pipe connecting structure comprising a cylindrical joint member for connecting a first pipe and a second pipe inserted into opposite ends of said cylindrical joint member towards the center of said cylindrical joint member in such a position that their ends are separated only by a narrow gap, whereby both ends and the center of said cylindrical joint member are compressed to hold the ends of said pipes in place and to form airtight seals between said first and second pipes and the ends of said cylindrical joint member and also between the ends of said first and second pipes and the middle part of said cylindrical joint member.

5. The pipe connecting structure described in claim 4 characterized in that ring-shaped grooves are cut around the outer circumference of said cylindrical joint member near the two ends of said cylindrical joint member.

6. The pipe connecting structure described in claim 4 characterized in that a protrusion is formed at the middle of the inside of said cylindrical joint member to aid in positioning the ends of said first and second pipes.

7. The pipe connecting structure described in claim 4 characterized in that the inside of said cylindrical joint member is lined with a soft layer of metal, alloy, ceramic, etc.

8. A connection method comprising the steps of providing a cylindrical joint member for connecting a first pipe and a second pipe inserted into opposite ends of said cylindrical joint member to the center of said cylindrical joint member and holding said pipes in such a position that their ends are separated only by a narrow gap, and compressing both ends and the center of said cylindrical joint member from outside to form airtight seals between said first and second pipes and the ends of said cylindrical joint member and also between the ends of said first and second pipes and the middle part of said cylindrical joint member, the compression of both ends and the center of said cylindrical joint member being done simultaneously.

* * * * *